Figure 1:
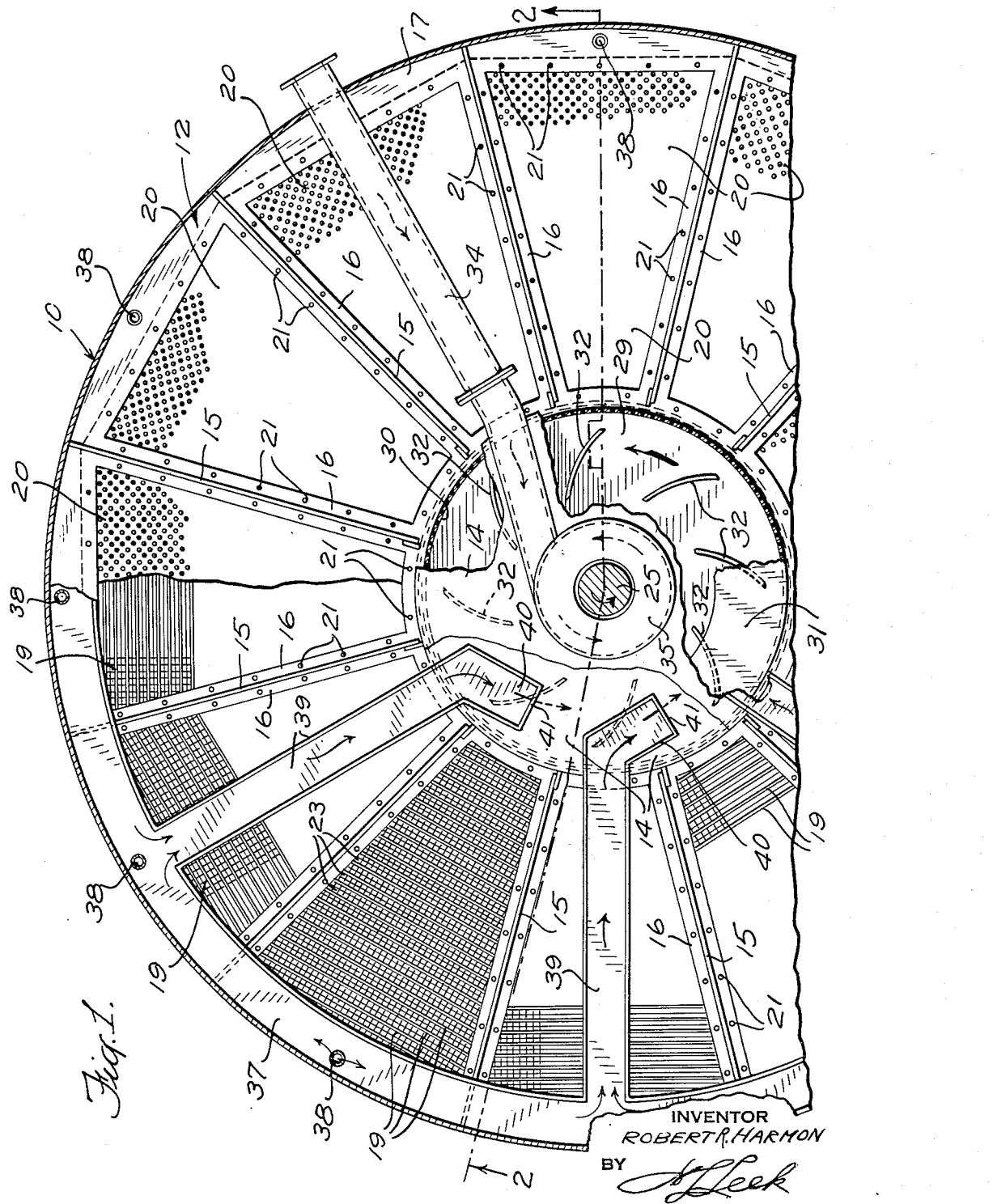

Dec. 28, 1948.  R. R. HARMON  2,457,667
GAS SCRUBBER

Filed Feb. 20, 1946  2 Sheets-Sheet 1

INVENTOR
ROBERT R. HARMON
BY
*N. J. Leek*
ATTORNEY

Dec. 28, 1948.　　　　　R. R. HARMON　　　　　2,457,667
GAS SCRUBBER
Filed Feb. 20, 1946　　　　　　　　　　　　2 Sheets-Sheet 2
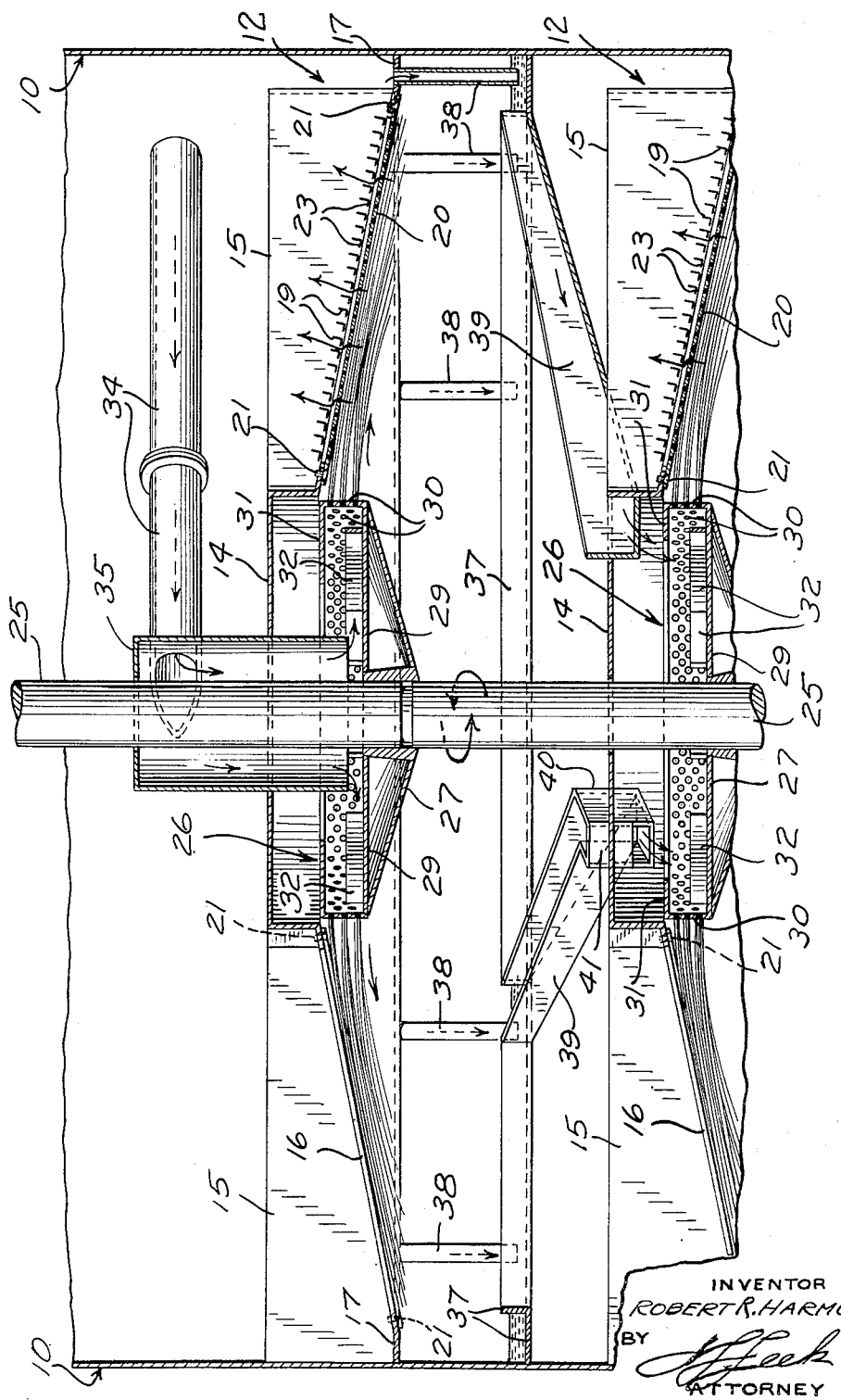
INVENTOR
ROBERT R. HARMON
BY
ATTORNEY Patented Dec. 28, 1948

2,457,667

UNITED STATES PATENT OFFICE 2,457,667

GAS SCRUBBER

Robert R. Harmon, Charlottesville, Va., assignor to Peabody Engineering Corporation, New York, N. Y., a corporation of New York Application February 20, 1946, Serial No. 648,889

5 Claims. (Cl. 261—113)

This invention relates to gas and liquid contact apparatus of the type having a plurality of vertically spaced treating zones including perforated plates through which the gas passes upwardly at a velocity suited to prevent the liquid on said plates from passing downwardly through the perforations. Such apparatus may be used for cleaning gases, for cooling, or for liquid-gas contact purposes.

In one embodiment the apparatus embodies baffles above each perforation against which the gas impinges for the removal of suspended particles and/or for increasing the time of contact between the gas and liquid. An apparatus of this type suited for use as a scrubber is disclosed in my Patent No. 2,319,814, dated May 25, 1943.

It is an object of the present invention to provide novel and improved means for the positive unobstructed distribution of large quantities of liquid upon the diaphragms of a gas and liquid contact apparatus of the above type.

Another object of the invention is to provide for the more efficient control and removal of the large volume of liquid which is employed in the apparatus.

Another object is to provide an apparatus of the above type having novel and improved details of construction and features of operation.

Various other objects and advantages will be apparent as the nature of the invention is more fully disclosed.

In one embodiment the invention is applied to a gas and liquid contact apparatus comprising a cylindrical upright casing containing a plurality of vertically spaced treating zones, each of which zones comprises a central imperforate diaphragm, a plurality of downwardly inclined radial members supporting said diaphragm, and a peripheral ledge secured to the inner wall of the casing and supporting the outer ends of the radial members. Segmental plates are secured to the diaphragms, the radial members and the peripheral ledges, and contain perforations for the passage of gas ascending through the casing.

In the preferred embodiment of the invention, a rotatable vertical shaft extends through the central diaphragms in the casing and a centrifugal sprayer is secured to the shaft beneath each such diaphragm in position to eject an unobstructed canopy of liquid spray on the underside of the adjacent segmental plates. Liquid is supplied to the sprayer at the topmost treating zone, and annular troughs are provided between the various treating zones for collecting the liquid from above and conveying it to the sprayer at the succeeding lower treating zone. Drain pipes are also provided between the peripheral ledge of each treating zone and the annular trough therebeneath, these pipes extending to a point adjacent the bottom of the trough to permit liquid in the trough to seal said pipes against the passage of gas therethrough.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Fig. 1 is a sectional plan view of a gas scrubber embodying the present invention, with the parts progressively broken away; and Fig. 2 is a vertical section taken on the line 2—2 of Fig. 1.

In the following description certain specific terms are used for convenience in referring to the various details of the invention. These terms, however, are to be interpreted as broadly as the state of the art will permit.

Referring to the drawings more in detail, the invention is shown as applied to a rotary type gas scrubber comprising a vertical cylindrical housing or casing 10 having a plurality of cleaning or cooling zones 12.

Each cleaning or cooling zone 12 is shown as comprising a central cap-shaped diaphragm 14 supported by a series of inclined radial members or ribs 15 having lateral flanges 16 and a horizontal peripheral ledge 17 which is secured to the inner wall of casing 10 by convenient means such as welding.

The gas cleaning elements at each cleaning or cooling zone 12 comprise a plurality of segmental baffle plates 19 which are secured to the under surfaces of the flanges 16 and ledge 17, and a plurality of segmental perforated plates 20 which are secured to said flanges and ledge directly beneath said baffle plates. These plates 19 and 20 may be secured in place by any suitable means such as bolts 21 having countersunk heads which do not project below the under surface of the plates. The baffle plates 19 have laterally extending tabs or baffles 23 which lie directly above the perforations of the perforated plates 20 and are spaced slightly from said perforations as shown in Fig. 2, so that gases ascending through the perforated plates will be deflected and the scrubbing action increased, as will be readily understood by anyone skilled in the art.

A rotatable vertical shaft 25 extends centrally through the central diaphragms 14 in casing 10. This shaft is actuated by any suitable means, not shown, rotation being in a counter-clockwise direction as viewed in Fig. 1. At each cleaning or cooling zone 12 a centrifugal sprayer element 26 is secured to the shaft 25 by means of ribs or spiders 27. The sprayer elements 26 are positioned directly beneath the stationary cap-shaped diaphragm 14, and each such sprayer element comprises an imperforate bottom plate 29, a sieve-like perforated cylindrical side wall 30, and an annular top wall or ledge 31 which extends only part way in from the periphery of the perforated side wall 30, as best shown in Fig. 2.

A cleaning or cooling liquid such as water is fed into the centrifugal sprayer elements 26 in a manner presently to be described, and the centrifugal force acting upon such liquid, under the impetus of arcuate blades 32 on the bottom plates 29 of the sprayer elements, causes the liquid to be thrown outwardly through the sieve-like cylindrical side walls 30 of the sprayer elements and form a canopy of spray on the underside of the inclined cleaning elements of each cleaning or cooling zone 12, as shown in Fig. 2. The angle of inclination of the perforated plates 20 in the various spray zones is coincident with the average of the tangents in a vertical plane to the trajectory of the spray generated by the centrifugal sprayer elements 26. This angle of inclination is preferred in order to insure complete and continued washing of the underneath side of the plates 20 to prevent plugging or fouling by entrained particles of foreign matter.

Inasmuch as the spray generated by the above-mentioned centrifugal action takes a path tangential to the respective sprayer elements 26, which path crosses the vertical planes through the radial supporting members 15 at an angle, it is necessary that such members be located above the perforated plates and that the segmental perforated plates 20 be fastened to said radial supports in such a way that there will be no downwardly projecting bolts or other elements to interfere with proper distribution of the spray. In the drawings the segmental plates 19 and 20 are secured to the radial supports 15 by bolts having countersunk heads. Other fastening means which avoids interference with the spray is disclosed in my co-pending application Serial No. 648,797, filed February 19, 1946 (now Patent No. 2,420,242 dated May 6, 1947). If there were projections beneath the segmental plates which intercepted the spray, there would be areas of the plates which would not be continuously washed, with the result that entrained foreign matter would accumulate under the plates and tend to foul the perforations, thereby blocking the flow of gas through the perforations.

Water or other liquid is supplied to the uppermost centrifugal sprayer element 26 through a pipe or conduit 34 which is connected tangentially to a cylindrical hood 35 mounted centrally on the uppermost diaphragm 14 and projecting downwardly within the sprayer element 26 to a point adjacent the bottom plate 29 thereof. The liquid entering the cylindrical hood 35 tangentially will swirl outwardly upon the bottom plate 29 of the sprayer element 26 in a circular direction corresponding with the direction in which said sprayer element 26 is rotating, and the centrifugal force of this swirling liquid, coupled with the thrust of the arcuate blades 32 which are curved to throw the liquid outwardly, causes the liquid to be ejected through the perforated side wall 30 of the sprayer element to form the canopy of spray described above.

Between the upper and lower cleaning or cooling zones 12 shown in Fig. 2, an annular trough 37 is secured to the inner peripheral wall of the casing 10 by convenient means such as welding. This trough 37 receives the part of the liquid which is thrown outwardly to the wall of the casing 10 by the centrifugal sprayer element above the trough, and liquid collected on the ledge 17 flows off through drain pipes 38 which discharge into the trough 37 below said ledge and also serve as water seals as hereinafter described. Disposed at suitable intervals about the trough 37 are a plurality of inclined chutes 39 having their lower ends 40 connected to the central diaphragm 14 at the lower cleaning zone 12. These lower ends 40 of chutes 39 are turned at an angle such that the liquid discharged therefrom will flow into the sprayer element 26 in the same direction in which said sprayer element is rotating. The mouths of the chutes 39 are secured to the diaphragm 14 as shown in Fig. 2 and the upper portion of each mouth is closed by a ledge 41 which prevents the liquid from spilling over the top of the diaphragm. The opening below the ledge 41 runs full of liquid to provide a seal.

In the operation of the device, water or other liquid entering the centrifugal sprayer elements 26 is sprayed uniformly into the ascending gas stream by the rotating sprayer elements and is directed against the underneath sides of the perforated plate segments 20 to keep them clean. A part of this water falls onto the gas cleaning plates below, flows crosswise of said plates and into the drain pipes 38 and troughs 37. Another part passes upwardly through the perforations with the gas onto the top of the plates above. Since the gas cleaning plate segments 19 and 20 are secured to the circumferential ledge 17 and to the flanges 16, all gas must pass upwardly through the perforations of plates 20. Water cannot flow down through the perforations while gas is passing upward through them, hence the water must flow over the plates into the troughs 37 and it then flows downwardly through the chutes 39 onto the next stage or cleaning zone below. The lower ends of the various drain pipes 38 extend to a point adjacent the bottom of the troughs 37 which is beneath the level of the water maintained in said troughs during the operation of the apparatus, hence the pipes 38 constitute water seals which prevent gas from flowing upward through the pipes and by-passing the perforated plate segments.

Although a specific embodiment of the invention has been shown for purposes of illustration, it is to be understood that the invention is capable of various uses and that changes and modifications may be made therein as will be readily apparent to a person skilled in the art. The invention is only to be limited in accordance with the scope of the following claims.

What is claimed is:

1. A gas and liquid contact apparatus comprising an upright casing and a treating zone therein, said zone comprising a transverse partition including a plate containing perforations for the passage of gas ascending through said casing, and a sprayer positioned to eject a canopy of liquid spray in a radial trajectory across the underside of said plate, said plate being inclined parallel to the average tangent to the trajectory of said spray so as to obtain maximum washing and its under surface being free from protuberances which could deflect said spray from said surface.

2. A gas and liquid contact apparatus comprising an upright casing and a treating zone therein, said zone comprising a transverse partition including a plate containing perforations for the passage of gas ascending through said casing and a centrifugal sprayer positioned to eject a canopy of liquid spray in a radial trajectory across the underside of said plate, said plate being inclined parallel to the average tangent to the trajectory of said spray so as to obtain maximum washing and having a smooth under surface free from protuberances which could deflect said spray from said surface.

3. A gas and liquid contact apparatus comprising an upright casing and a plurality of vertically spaced treating zones therein, each zone comprising an imperforate support, and a plate secured thereto having perforations for the passage of gas ascending through said casing, a sprayer beneath each of said plates positioned to eject a canopy of liquid spray in a radial trajectory across the underside of said plates, and means entirely above the under surface of said plates for attaching said plates to said supports, the under surfaces of said plates being smooth and devoid of projections which could deflect said spray from said surfaces, said plates being inclined to conform to the average tangent of the trajectory of said spray so as to obtain maximum washing thereby.

4. A gas and liquid contact apparatus comprising an upright casing and a plurality of vertically spaced treating zones therein, each zone comprising a central imperforate diaphragm, a plurality of radial members in said casing supporting said diaphragm, plates secured to said diaphragms and to said radial members containing perforations for the passage of gas ascending through said casing, a rotatable vertical shaft in said casing extending through said central diaphragms, a centrifugal sprayer secured to said shaft beneath each of said central diaphragms, each sprayer comprising a cup having an imperforate bottom wall and a perforated side wall positioned to eject a canopy of liquid spray in a radial trajectory across the underside of the adjacent plate, means for supplying liquid to the topmost centrifugal sprayer, an annular trough for collecting liquid in each zone secured to said casing, inclined chutes connecting said troughs to the next lower centrifugal sprayer for supplying liquid thereto, said plates being inclined to conform to the average path of the trajectory of said spray so as to obtain maximum washing thereby.

5. A gas and liquid contact apparatus comprising an upright casing and a plurality of vertically spaced treating zones therein, each zone comprising a central imperforate diaphragm and a plurality of radial members supporting said diaphragm in said casing, segmental plates secured to said diaphragms and to said radial members containing perforations for the passage of gas ascending through said casing, a rotatable vertical shaft in said casing extending through said central diaphragms, a centrifugal sprayer secured to said shaft beneath each of said central diaphragms and including an imperforate bottom plate and a perforated cylindrical side wall positioned to eject a canopy of liquid spray in a radial trajectory across the underside of the adjacent segmental plates, means for supplying liquid to the topmost centrifugal sprayer, an annular trough for collecting liquid secured to said casing in each of said vertically spaced treating zones, inclined chutes connecting said troughs to the next lower centrifugal sprayer, said plates being inclined to conform to the average path of the trajectory of said spray so as to obtain maximum washing thereby.

ROBERT R. HARMON.

REFERENCES CITED

The following references are of record in the file of this patent:

UNITED STATES PATENTS

| Number | Name | Date |
|---|---|---|
| 1,752,045 | Wagner | Mar. 25, 1930 |
| 1,848,945 | Genter | Mar. 8, 1932 |
| 2,007,759 | Harmon | July 9, 1935 |

FOREIGN PATENTS

| Number | Country | Date |
|---|---|---|
| 665,284 | France | May 6, 1929 |
| 479,765 | Germany | July 11, 1924 |